C. Marsh. 2d
Cotton Scraper.
No. 113,320. Patented Apr. 4, 1871.
2 Sheets, Sheet 1.
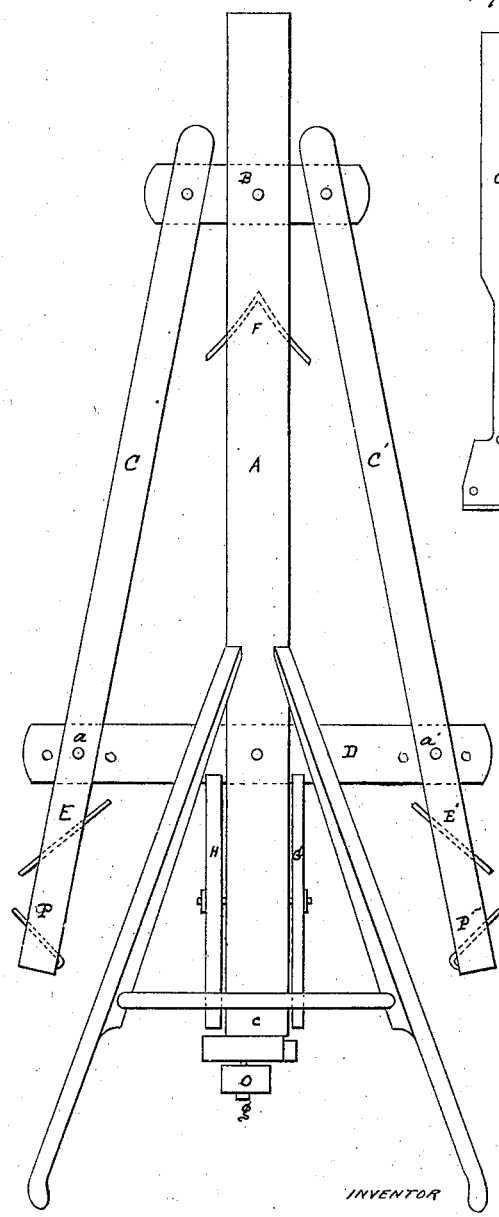
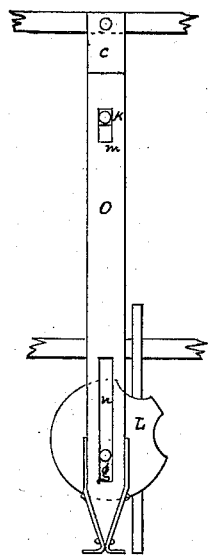
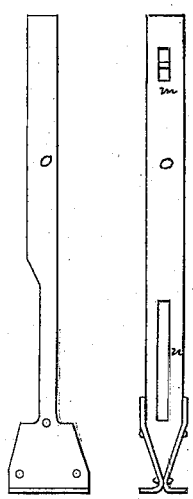 
WITNESSES
INVENTOR
Cyrus Marsh 2d

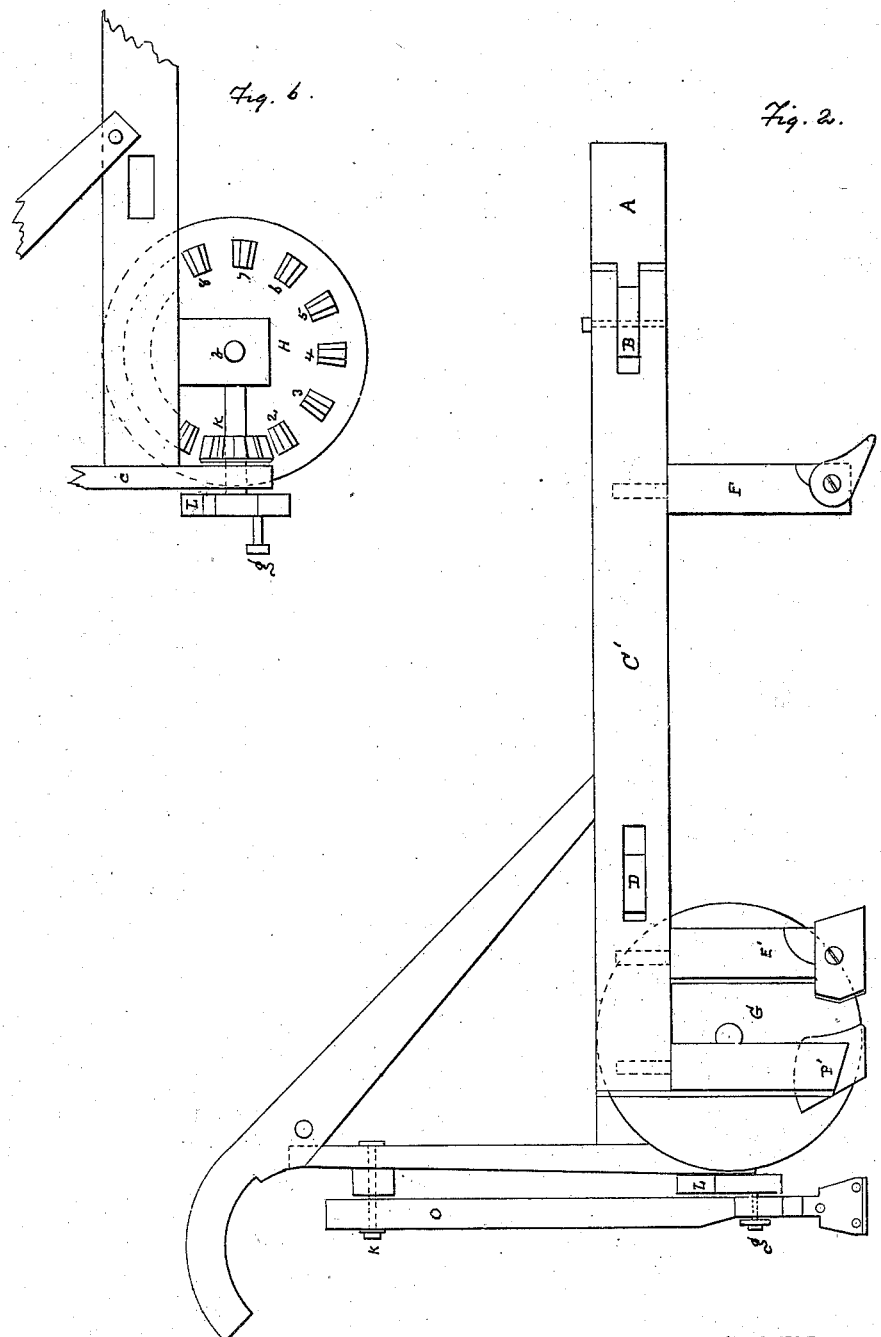

UNITED STATES PATENT OFFICE.

CYRUS MARSH, 2D, OF NATCHEZ, MISSISSIPPI.

IMPROVEMENT IN COTTON SCRAPERS, HILLERS, AND CULTIVATORS.

Specification forming part of Letters Patent No. 113,320, dated April 4, 1871.

*To all whom it may concern:*

Be it known that I, CYRUS MARSH, 2d, of Natchez, Adams county, State of Mississippi, have invented a new and useful Cotton-Scraper, Hiller, and Cultivator, of which the following is a full, clear, and exact description, reference being had to the annexed drawing, making a part of this specification, and in which—

Figures 1 and 2 represent, respectively, a top-plan and side view of my apparatus. Figs. 3, 4, 5, and 6 represent detached views of parts of same, hereinafter described.

Similar letters indicate like parts.

The object of my invention is to unite in one machine a cotton scraper, hiller, and cultivator, the same being adapted for use in either capacity, by simply interchanging and adjusting certain parts, thus combining in practically one machine all the implements required in the cultivation of a crop of cotton after the same has been planted.

The first working which cotton receives after planting is to be thinned out and scraped, and this I perform by the machine now to be described.

A, Figs. 1 and 2, represents the ordinary plow-beam, provided with handles, as shown, and having a cross-piece, B, to which are pivoted the arms C C', Fig. 1, C', Fig. 2, having slots near their ends to receive another cross-piece, D, on which they slide, being kept at any desired point on same by the set-screws $a$ $a'$, Fig. 1. Beneath the beam are two wheels, G and H, on a common shaft, having its bearings in an offset, $b$, Fig. 6, from the beam. The former of these wheels, G, Figs. 1, 2, is sharp on its edge, while the other, H, Figs. 1, 6, has a broad tread, and, if desired, may be made with a cogged periphery. The one is made sharp, so as to hold the machine to its course, and the latter made broad, as it is to act as a driving-wheel, as hereinafter described. This offset $b$ and the upright $c$, Figs. 1, 2, 3, 6, afford bearings for the shaft of the pinion K, Fig. 6, and the wheel L, Figs. 1, 2, 3, 6, the pinion gearing with the cogs 1 2 3, &c., Fig. 6, on the inner face of the wheel H. Pivoted to the upright $c$ is a scraper, $o$, Figs. 2, 3, 4, 5, the pivot K passing through the slot $m$, while another slot, $n$, receives the pin $g$, as seen in Fig. 3.

Having inserted the scrapers E E', Figs. 1, 2, (the latter figure showing the manner of insertion,) and having set the arms C C' to correspond to the width of the cotton-hills, the machine is ready to scrape.

The wheels H and G run on either side of row of cotton, the scrapers E E' scrape the sides of the rows, while the revolution of the wheel L, giving a reciprocating motion to the scraper O, causes it to stir up the earth between the hills of cotton, and at the same time form these hills by cutting out the superfluous cotton in the rows.

By putting a second row of cogs on the wheel H and making the pinion-shaft slide in its bearings, or the pinion slide on the shaft so as to engage with this second row, the scraper O may be adjusted to scrape cotton in hills of different distances apart.

After the cotton is scraped, remove the scrapers E E' and O, and insert the hilling-plows P P', Fig. 1, P', Fig. 2, they being inserted in the same manner as E E', but considerably back of their position, as shown.

These plows are set as shown so as to throw the furrow-slice toward the drill of cotton.

The wheels H and G, passing one on each side of the hills, receive the furrow thus thrown up by P P', preventing the small cotton from being covered by the earth, and, as they pass on, allowing the earth to fall gradually and gently around the cotton, and completing the hills.

When this process of hilling or molding is completed the plows P P' are removed, and the wheels H and G also, and then the double plow F, Figs. 1, 2, being inserted, as shown, the machine is converted into a cultivator, to work among the cotton till the crop is gathered.

What I claim as my invention, and desire to secure by Letters Patent, is—

The beam A, with its wheels H G, adjustable arms C C', scrapers E E' and O, the latter acted upon by the wheel L, which receives its motion from the pinion K, gearing with the cogs on H, and all combined, constructed, and arranged for joint operation as and for the purpose shown and specified.

C. MARSH, 2D.

Witnesses:
H. J. WILKINS,
O. WOOD.